(12) United States Patent
Miyoshi et al.

(10) Patent No.: US 10,464,786 B2
(45) Date of Patent: Nov. 5, 2019

(54) METHOD FOR CONTROLLING STORAGE/RETRIEVAL DEVICE IN FLAT STORAGE FACILITY

(71) Applicant: Daifuku Co., Ltd., Osaka (JP)

(72) Inventors: Kazuhiko Miyoshi, Shiga (JP); Masato Inaba, Shiga (JP); Jun Hamaguchi, Shiga (JP)

(73) Assignee: Daifuku Co., Ltd. (JP)

( * ) Notice: Subject to any disclaimer, the term of this patent is extended or adjusted under 35 U.S.C. 154(b) by 92 days.

(21) Appl. No.: 15/809,691

(22) Filed: Nov. 10, 2017

(65) Prior Publication Data

US 2018/0086609 A1 Mar. 29, 2018

Related U.S. Application Data

(63) Continuation of application No. PCT/JP2016/057114, filed on Mar. 8, 2016.

(30) Foreign Application Priority Data

Jun. 1, 2015 (JP) ................................. 2015-111098

(51) Int. Cl.
*B66C 13/23* (2006.01)
*B65G 1/04* (2006.01)
(Continued)

(52) U.S. Cl.
CPC ............ *B66C 13/23* (2013.01); *B65G 1/0421* (2013.01); *B65G 1/0464* (2013.01);
(Continued)

(58) Field of Classification Search
CPC .............................. B66C 13/48; B65G 1/0464
See application file for complete search history.

(56) References Cited

U.S. PATENT DOCUMENTS 6,785,624 B2 * 8/2004 Stengele ................ B25J 9/1692
700/254
8,803,055 B2 * 8/2014 Lau ........................ B25J 9/1692
250/203.2
(Continued)

FOREIGN PATENT DOCUMENTS

JP H06131032 A 5/1994
JP 2001301922 A 10/2001
(Continued)

OTHER PUBLICATIONS

Machine translation of JP2001301922 from espacenet. Accessed on Apr. 8, 2019. (Year: 2001).*

*Primary Examiner* — Mark C Hageman
(74) *Attorney, Agent, or Firm* — St. Onge Steward Johnston & Reens LLC (57) ABSTRACT

A flat storage facility includes a storage/retrieval device having a Y-direction moving member that is horizontally movable at a certain height above a storage item placement plane. A carriage is horizontally movable in an X direction on the Y-direction moving member, and a storage item gripping mechanism is provided in the carriage. The storage/retrieval device performs storage/retrieval on a storage item between the storage/retrieval device and respective storage item placement points set on the storage item placement plane. The storage item placement plane is divided into a plurality of unit sections at various heights with respect to a reference plane. When the storage/retrieval operation is performed with the storage/retrieval device, the lowering distance of the storage item gripping mechanism with respect to the carriage is adjusted according to the height of the unit section to which the storage item placement point of a storage/retrieval target belongs.

10 Claims, 11 Drawing Sheets

(51) Int. Cl.
*B65G 63/00* (2006.01)
*B66C 13/46* (2006.01)

(52) U.S. Cl.
CPC ............ *B65G 63/002* (2013.01); *B66C 13/46* (2013.01); *B65G 2201/02* (2013.01)

(56) References Cited

U.S. PATENT DOCUMENTS

| | | | |
|---|---|---|---|
| 10,030,972 B2 * | 7/2018 | Iseli | G01B 5/008 |
| 2014/0017052 A1 * | 1/2014 | Honkanen | B65G 1/0421 |
| | | | 414/626 |

FOREIGN PATENT DOCUMENTS

| | | |
|---|---|---|
| JP | 2007142269 A | 6/2007 |
| JP | 2008262276 A | 10/2008 |

* cited by examiner

METHOD FOR CONTROLLING STORAGE/RETRIEVAL DEVICE IN FLAT STORAGE FACILITY

TECHNICAL FILED

The present invention relates to a method for controlling a storage/retrieval device for storing and retrieving a storage item in a flat storage facility in which the storage item is directly placed on a storage item placement plane.

BACKGROUND ART

As this type of flat storage facility, for example, as disclosed in Japanese Published Unexamined Patent Application No. 2008-262276 (Patent Literature 1), a flat storage facility has been known which includes a storage item placement plane and a storage/retrieval device, in which the storage/retrieval device includes a Y-direction laterally moving member that is freely moved horizontally and laterally at a certain height above the storage item placement plane, a carriage that is freely moved horizontally in an X direction perpendicularly intersecting the Y direction above the Y-direction laterally moving member, and a storage item gripping means that is provided in the carriage so as to be freely raised and lowered, and in which the storage/retrieval device is configured so as to perform storage/retrieval on a storage item between respective storage item placement points set on the storage item placement plane.

SUMMARY OF INVENTION

In the flat storage facility configured as described above, since the storage item is directly placed on the storage item placement plane, when it is assumed that the Y-direction lateral movement of the Y-direction laterally moving member and the X-direction movement of the carriage are performed along a horizontal plane, a precondition for safely and reliably performing a gripping/gripping release action for the storage item with a storage item gripping means which is lowered by a preset lowering distance from the carriage located at a certain height directly above the storage item placement point of a storage/retrieval target is that the storage item placement plane must be horizontal. However, it is rare that the floor surface of a building utilized as the storage item placement plane is secured to be horizontal with sufficient accuracy over the entire region of the wide storage item placement plane, and when the flat storage facility is constructed, repair work for enhancing the horizontal accuracy of the floor surface of the building utilized as the storage item placement plane is usually involved, with the result that the cost of the entire facility is increased.

The present invention proposes a method for controlling a storage/retrieval device in a flat storage facility which can solve the conventional problem as described above, and for ease of understanding of a relationship with an embodiment which will be described later, the feature of the controlling method will be shown with reference signs which are used in the description of the embodiment and which are placed in parentheses. In a method for controlling a storage/retrieval device in a flat storage facility which includes a storage item placement plane (1) and a storage/retrieval device (2), in which the storage/retrieval device (2) includes a Y-direction laterally moving member (3) that is freely moved horizontally and laterally in a Y direction at a certain height above the storage item placement plane (1), a carriage (5) that is freely moved horizontally in an X direction perpendicularly intersecting the Y direction on the Y-direction laterally moving member (3), and a storage item gripping means (6) that is provided in the carriage (5) so as to be freely raised and lowered, and in which the storage/retrieval device (2) performs storage/retrieval on a storage item (C) between the storage/retrieval device (2) and respective storage item placement points (Cp) set on the storage item placement plane (1), it is the feature of the control method that the storage item placement plane (1) is divided into a plurality of unit sections (A), for each of the unit sections (A), a difference in height with respect to a reference plane of the storage item placement plane (1) is measured and recorded, and when the storage/retrieval operation is performed with the storage/retrieval device (2), the lowering distance of the storage item gripping means (6) with respect to the carriage (5) is adjusted by the difference in height of the unit section (A) to which the storage item placement point (Cp) of a storage/retrieval target belongs.

In the method for controlling the flat storage facility according to the present invention, even when, at the time of the storage/retrieval operation, there is a difference in height with respect to the reference plane in a flat surface portion where the storage item placement point of the storage/retrieval target is present on the storage item placement plane, the storage item gripping means can be lowered to a certain height when viewed from the flat surface portion where the storage item placement point of the storage/retrieval target is present. In other words, in a case where the flat surface portion where the storage item placement point of the storage/retrieval target is present is higher than the reference plane, the lowered storage item gripping means is prevented from abnormally approaching the flat surface portion, and, in an opposite case where the flat surface portion where the storage item placement point of the storage/retrieval target is present is lower than the reference plane, the lowered storage item gripping means is prevented from being abnormally moved away from the flat surface portion. Therefore, it eliminates the possibility that the storage item is drawn in the lateral direction at the time of the gripping release action of the storage item gripping means or is dropped to collide against the flat surface portion where the storage item placement point is present such that the storage item is displaced from a proper position as a result of performing the gripping release action of the storage item gripping means in a state where the storage item is pressed onto the flat surface portion where the storage item placement point is present at the time of the storage operation, or in an opposite state where the storage item is not supported to the flat surface portion where the storage item placement point is present at the time of the storage operation (where the storage item floats), and it is possible to safely and reliably lower the storage item onto the proper position. Also, when the storage/retrieval operation is performed, it eliminates the possibility that the gripping action of the storage item gripping means is performed on a position displaced in the up/down direction from the proper position of the storage item to be retrieved, and thus it is possible to safely and reliably perform the gripping and lifting action for the storage item.

As a matter of course, when among the vertical distances up to the storage item placement plane measured with the distance measuring means, the maximum value is set to the reference plane, since such a situation that the flat surface portion where the storage item placement point of the storage/retrieval target is present becomes lower than the reference plane no longer occurs, in the adjustment of the lowering distance of the storage item gripping means, adjustment is made such that the lowering distance is constantly reduced by a difference in height measured with respect to the reference value for the reference plane. By contrast, when among the vertical distances up to the storage item placement plane measured with the distance measuring means, the minimum value is set to the reference plane, since such a situation that the flat surface portion where the storage item placement point of the storage/retrieval target is present becomes higher than the reference plane no longer occurs, in the adjustment of the lowering distance of the storage item gripping means, adjustment is made such that the lowering distance is constantly increased by a difference in height measured with respect to the reference value for the reference plane. However, if the situation is such that the difference in height with respect to the reference plane is significantly increased, it is also possible that an intermediate value between the maximum value and the minimum value of the vertical distance up to the storage item placement plane measured with the distance measuring means can be set to the reference plane.

It is noted that, in a case where the implementation of the method of the present invention, in a case where the presence of an abnormal flat surface portion such as a locally elevated portion or a deeply recessed portion is visually recognized in the storage item placement plane, an in a case where it is considered that the abnormal flat surface portion may damage the stable support of the storage item, the abnormal flat surface portion can be removed from the unit sections in which the vertical distance up to the storage item placement plane is measured with the distance measuring means and can be omitted from the set region of the storage item placement point on the storage item placement plane. As the size of the unit section in which the vertical distance up to the storage item placement plane is measured with the distance measuring means is decreased, the situation of unevenness on the storage item placement plane can be grasped more accurately. However, the number of times of measurements is increased, and thus the time and cost are increased. Therefore, in a case where the unevenness is found to be significantly small by the visual observation of the situation of unevenness on the entire storage item placement plane, the size of the unit section is preferably increased such that the number of times of measurements is reduced and thus the time and cost are reduced.

Furthermore, the unit sections do not always need to have the same size over the entire region of the storage item placement plane, and depending on the visual observation of the situation of unevenness on the entire storage item placement plane, the unit section for a region where the degree of unevenness is high can be decreased in size, and the unit section for a region where the degree of unevenness is low can be increased in size. As a matter of course, it is also possible that, independent of the visual observation of the situation of unevenness on the entire storage item placement plane, based on the results of the above-described measurements performed on preset relatively large unit sections, the size of the unit sections in a specific region is decreased and measurements can be performed again.

That is, as a result of the measurement of a difference in height of each unit section with respect to the reference plane, with respect to a specific unit section in which a difference in height that is equal to or more than a set value is measured as compared with differences in height of other unit sections, the specific unit section is further divided into a plurality of small sections, for each of the small sections, the difference in height is measured again, and when the storage/retrieval is performed on the storage item placement point belonging to the specific unit section, the lowering distance of the storage item gripping means with respect to the carriage can be adjusted by the difference in height of the small section to which the storage item placement point of the storage/retrieval target belongs. In this method, independent of the visual observation of the situation of unevenness on the entire storage item placement plane, after efficiently performing the measurements on the entire storage item placement plane based on the preset relatively large unit sections, for the specific unit section identified based on the results of the measurements, the size of the section to be measured is decreased and measurements are performed again. Therefore, without decreasing the size of all the unit sections from the beginning to perform time-consuming measurements, it is possible to obtain the optimal "lowering distance adjustment value of the storage item gripping means" for each of all the storage item placement points on the entire storage item placement plane, with the result that it is possible to safely and satisfactorily perform the storage/retrieval operation on the storage item.

In addition, in a case where the controlling method of present invention is implemented, it is possible that the distance measuring means which is moved in the X direction together with the carriage of the storage/retrieval device is provided, for each of the unit sections dividing the storage item placement plane, the vertical distance up to the storage item placement plane is measured with the distance measuring means, and a difference in height with respect to the reference plane can be computed from the measured value and be recorded. In this method, it is possible to easily implement the invention only by attaching the distance measuring means to the storage/retrieval device included in the flat storage facility.

Specifically, although the distance measuring means can also be attached to the carriage of the storage/retrieval device, the distance measuring means is attached to the lower end portion of the storage item gripping means which is supported so as to be freely raised and lowered with respect to the carriage, thus the storage item gripping means is lowered at the time of the measurement and the measurement distance is thereby shortened, with the result that it is possible to reduce an error in the measurement. Furthermore, when the distance measuring means is attached to the support member (the storage item can be used instead) gripped by the storage item gripping means, the distance measuring means can be attached by utilization of the gripping function of the storage item gripping means, and it is no longer necessary to provide a special device for attaching and removing the distance measuring means, with the result that it is possible to easily implement the invention.

DESCRIPTION OF EMBODIMENTS

Figure 1:
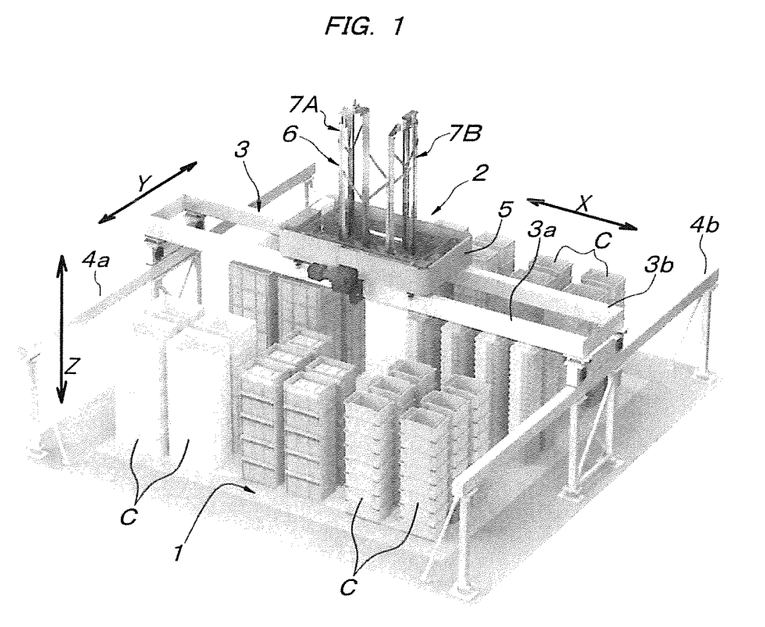
FIG. 1 is a perspective view showing an example of the configuration of an entire storage facility.

In FIG. 1, reference sign 1 denotes a rectangular storage item placement plane, and reference sign 2 denotes a storage/retrieval device. Reference sign 3 denotes a Y-direction laterally moving member, and the Y-direction laterally moving member 3 includes two guide rails 3*a* and 3*b* parallel to an X direction (left/right direction). Reference sign 4*a* and 4*b* denote a pair of fixed guide rails which are placed parallel to the Y direction on both outsides of the storage item placement plane 1 in the X direction, and the pair of fixed guide rails 4*a* and 4*b* support both end portions of the Y-direction laterally moving member 3 in the X direction such that the Y-direction laterally moving member 3 is freely moved parallel to the Y direction (forward/backward direction) above a certain height of the storage item placement plane 1. The storage/retrieval device 2 is configured with a carriage 5 which is supported by the two guide rails 3*a* and 3*b* on the Y-direction laterally moving member 3 so as to be freely moved in the X direction and a storage item gripping means 6 which is supported by the carriage 5 so as to be freely raised and lowered.

Figure 2A:
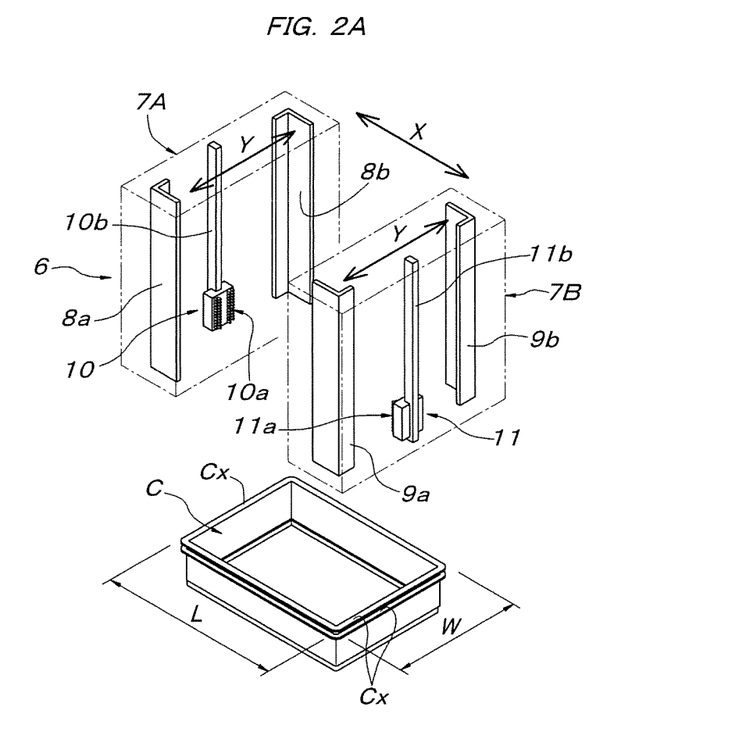
FIG. 2A is a perspective view showing the storage item gripping means of a storage/retrieval device and a storage item in the storage facility.

Although as the storage item gripping means 6, various types thereof which are configured so as to be compatible with the storage items to be handled can be considered, the storage item gripping means 6 in this embodiment includes an X-direction pair of gripping units 7A and 7B such that the gripping units 7A and 7B are freely moved close to and away from each other in the X direction. Both the gripping units 7A and 7B are supported to the carriage 5 so as to be raised and lowered between the two guide rails 3*a* and 3*b* of the Y-direction laterally moving member 3 and to be freely raised and lowered in synchronization with each other, and include Y-direction pairs of gripping columnar members 8*a* to 9*b* and lifting tools 10 and 11 located in a center position between the gripping columnar members 8*a* and 8*b* and in a center position between the gripping columnar members 9*a* and 9*b*. A storage item C that is handled in this embodiment is a rectangular plastic transport container which has, in a planar shape, a width W in the Y direction and a length L in the X direction, and includes, on its outside surface, a reinforcement overhanging rib Cx which is continuous over the entire periphery.

The respective gripping columnar members 8*a* to 9*b* are columnar members which can be fitted from the outside to the four corners of the storage item C and whose horizontal cross section is formed in the shape of the letter L, and in the lifting tools 10 and 11, engagement tools 10*a* and 11*a* which are freely engaged and disengaged with the reinforcement overhanging rib Ca in the center portions of both sides of the storage item C parallel to the Y direction are provided on at least the inner sides of the lower end portions of raising/lowering columnar members 10*b* and 11*b*. The engagement tools 10*a* and 11*a* include a large number of pins which protrude from vertical rectangular surfaces parallel to the Y direction and which are parallel to the X direction, and the respective pins are held in a protruding posture where the pins are protruded inward by springs.

Figure 2B:
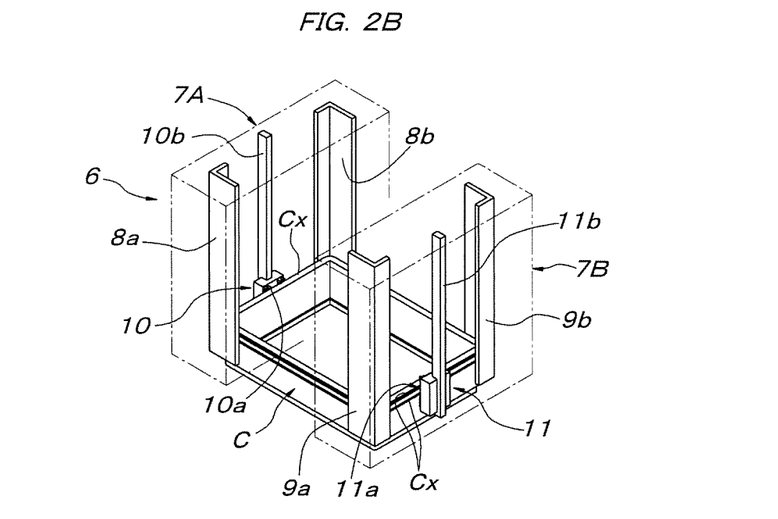
FIG. 2B is a perspective view showing a state where the storage item gripping means grips the storage item.

According to the storage facility configured as described above, by the lateral movement of the Y-direction laterally moving member 3 in the Y direction and movement of the carriage 5 on the Y-direction laterally moving member 3 in the X direction, the storage item gripping means 6 can be moved to a certain height above a desired position (including a transport terminal end portion of a storage conveyor and a transport beginning end portion of a retrieval conveyor, although not shown in the figure) on the storage item placement plane 1. On the other hand, the storage item gripping means 6 can be switched between a gripping action releasing state and a gripping action state. In the gripping action releasing state of the storage item gripping means 6, the gripping units 7A and 7B are in an X-direction retract limit position in which the gripping units 7A and 7B are separated from each other in the X direction, and the gripping columnar members 8*a*, 8*b*, 9*a*, and 9*b* are in a Y-direction retract limit position in which the gripping columnar members 8*a*, 8*b*, 9*a*, and 9*b* are separated from each other in the Y direction with respect to the lifting tools 10 and 11 located at their respective center positions. In the gripping action state of the storage item gripping means 6, the gripping units 7A and 7B are moved up to a distance corresponding to the X-direction length L of the storage item C so as to approach each other in the X direction, and simultaneously, the respective gripping columnar members 8*a*, 8*b*, 9*a*, and 9*b* are moved up to a distance corresponding to the Y-direction width W of the storage item C so as to approach each other in the Y direction with respect to the lifting tools 10 and 11 located at their respective center positions, and as shown in FIG. 2B, the four gripping columnar members 8*a* to 9*b* are fitted from the outside to the four corners of the storage item C so as to position the storage item C, and simultaneously, the respective engagement tools 10*a* and 11*a* of the pair of the lifting tools 10 and 11 are engaged with the reinforcement overhanging rib Ca on the outside surface of the storage item C parallel to the Y direction. In a state where the engagement tools 10*a* and 11*a* are engaged with the reinforcement overhanging rib Ca in the storage item C, at least two pins at the same height in the protruding posture in the respective engagement tools 10*a* and 11*a* enter the lower side of the reinforcement overhanging rib Ca in the storage item C, and pins which collide against the reinforcement overhanging rib Ca are brought into a state where they are retracted against a biasing force.

When the storage item C is transported by the storage item gripping means 6, the storage item gripping means 6 is moved to a position directly above the storage item C to be retrieved by the lateral movement of the Y-direction laterally moving member 3 in the Y direction and the movement of the carriage 5 on the Y-direction laterally moving member 3 in the X direction. Then, the gripping units 7A and 7B of the storage item gripping means 6 in the gripping action releasing state are lowered to the height of the storage item C to be retrieved with respect to the carriage 5, and thereafter the storage item gripping means 6 is switched to the gripping action state. Consequently, as shown in FIG. 2B, the four gripping columnar members 8*a* to 9*b* are fitted from the outside to the four corners of the storage item C so as to position the storage item C, and simultaneously, the respective engagement tools 10a and 11a of the pair of the lifting tools 10 and 11 are engaged with the reinforcement overhanging rib Ca in the storage item C, then the storage item gripping means 6 in the gripping action state is raised to a raising limit height with respect to the carriage 5 or to such a height that the horizontal transport of the storage item C is not obstructed.

The storage item C to be retrieved is lifted to a predetermined height as described above, then the storage item C gripped by the storage item gripping means 6 is horizontally transported to a target lowering position by the lateral movement of the Y-direction laterally moving member 3 in the Y direction and the movement of the carriage 5 on the Y-direction laterally moving member 3 in the X direction. The lateral movement of the Y-direction laterally moving member 3 and the movement of the carriage 5 may be performed simultaneously with the process for lifting the storage item C to be retrieved to the predetermined height. Thereafter, the storage item gripping means 6 gripping the storage item C is lowered to a predetermined height with respect to the carriage 5, the storage item C gripped by the storage item gripping means 6 is lowered to the target position, and then the storage item gripping means 6 in the gripping action state is switched to the gripping action releasing state so as to release the storage item C from the storage item gripping means 6, and the process for lowering the storage item C to the target position is completed. Thereafter, the storage item gripping means 6 in the gripping action releasing state is raised to a predetermined height with respect to the carriage 5, and thus a series of storage item lifting transport steps are completed.

It is noted that, when the storage items C can be stacked, a plurality of storage items C in a stacked state can be collectively lifted and transported by the gripping action of the storage item gripping means 6 on the lowermost storage item C. Although at this time, only the lowermost storage item C is lifted by the lifting tools 10 and 11 of the storage item gripping means 6, since the four corners of all of the storage items C in a stacked state including the lowermost storage item C are positioned by the four gripping columnar members 8a to 9b, the stacked state is stably held. It is a matter of course that, in order to handle a large number of stacked storage items, in the lifting tools 10 and 11, the engagement tools 10a and 11a can also be provided vertically in a plurality of stages on the raising/lowering columnar members 10b and 11b. By the operation of the storage item gripping means 6, it is also possible to transport out only a specific storage item C among a plurality of storage items C in a stacked state and to newly stack another storage item C on the storage item C stored on the storage item placement plane 1.

Figure 3:
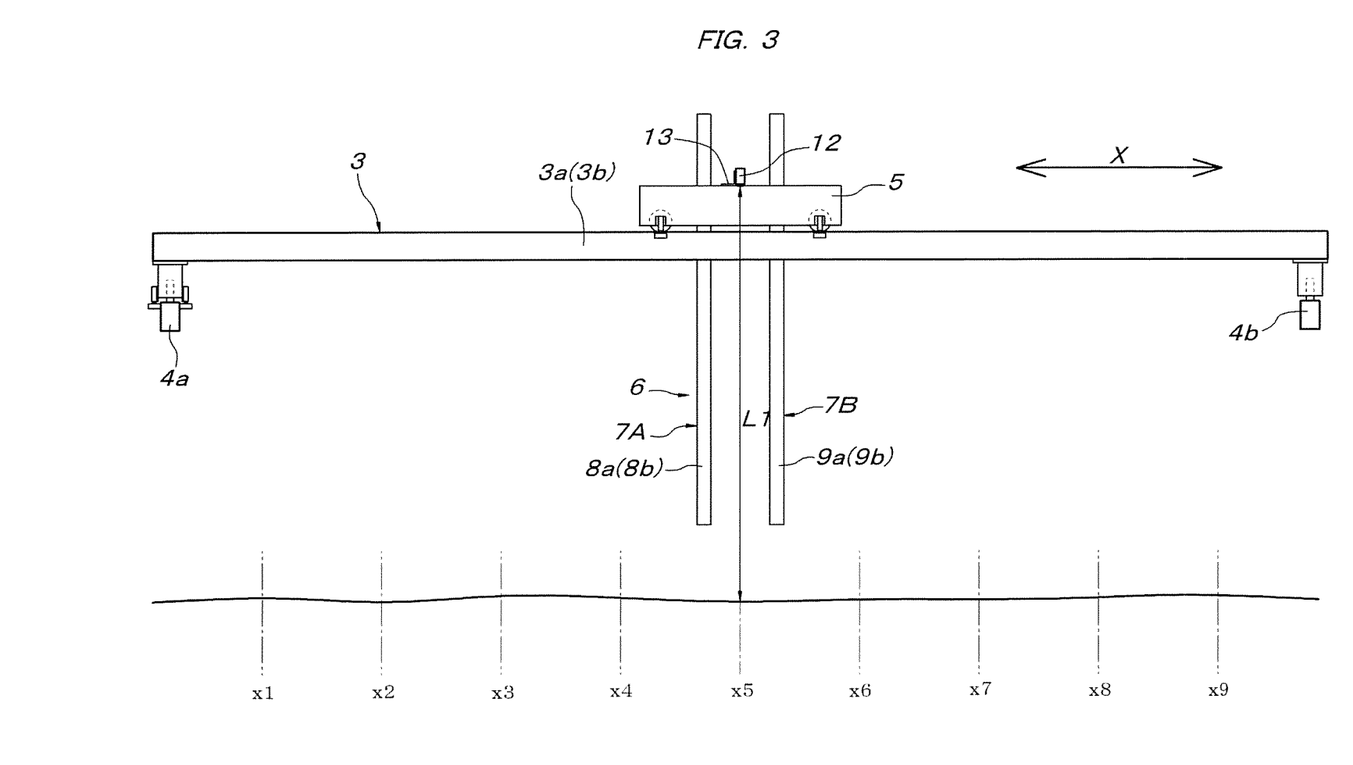
FIG. 3 is a front view illustrating an embodiment in which a distance measuring means is attached to the carriage of the storage/retrieval device and a state where a vertical distance up to a storage item placement plane is measured.
Figure 4:
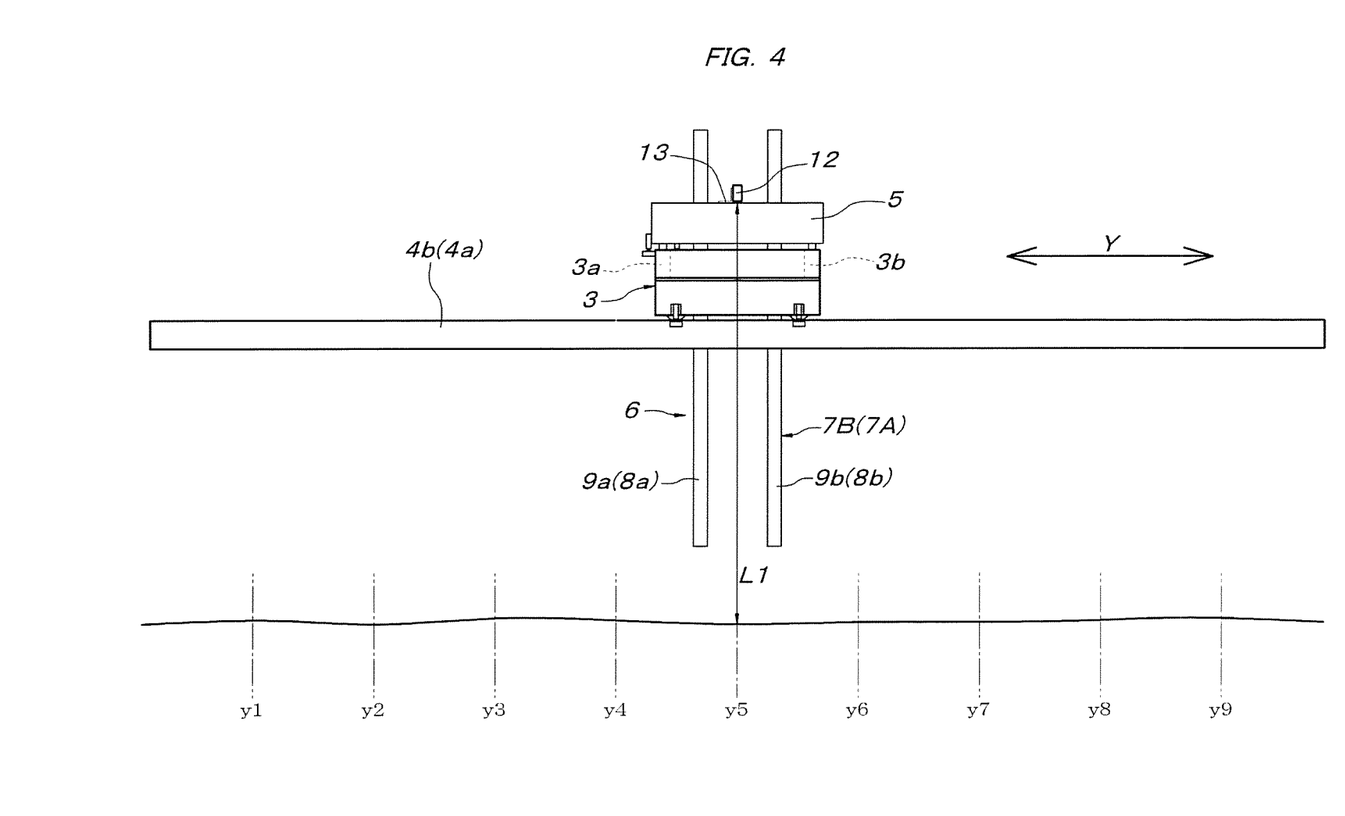
FIG. 4 is a side view of FIG. 3.
Figure 5A:
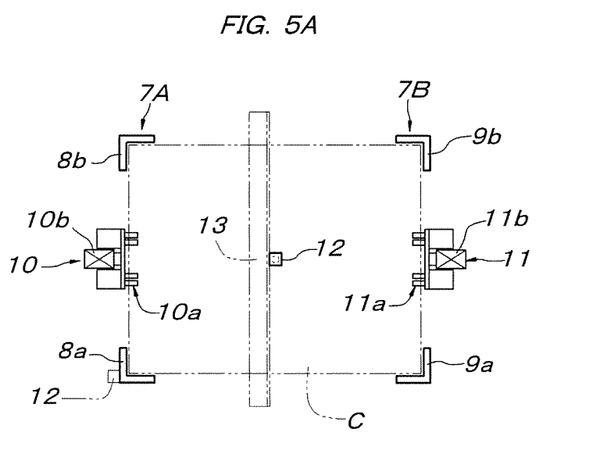
FIG. 5A is a plan view showing an attachment structure of the distance measuring means.
Figure 5B:
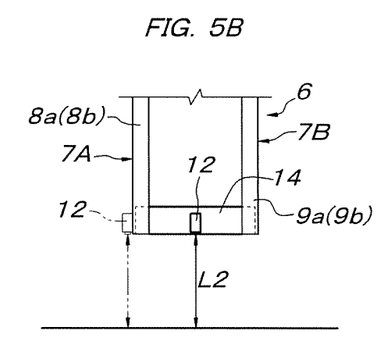
FIG. 5B is a side view showing another attachment structure of the distance measuring means.

Although the storage facility can be used as described above, the following measuring/setting operation is performed before the storage facility is actually operated. That is, as shown in FIGS. 3, 4, and 5A, in order to perform the measurement/setting operation, a distance measuring means 12 for measuring a vertical distance up to the storage item placement plane 1 is temporarily attached to the carriage 5. Specifically, a support member 13 in which the distance measuring means 12 is attached to a center portion in a length direction so as to face downward is attachably/detachably laid on the carriage 5 such that the vertical center line of a quadrangle surrounded by the four gripping columnar members 8a to 9b matches the distance measuring means 12. Instead of attaching the distance measuring means 12 to the carriage 5 as described above, as shown in FIG. 5B, as with the storage item C, the distance measuring means 12 is attached to a center position of the flat surface of a support member 14 which can be gripped by the storage item gripping means 6 and which is rectangular in plan view so as to face downward, and when the measurement/setting operation is performed, as with the storage item C, the support member 14 can be gripped by the lower end portion (the lower end portions of the four gripping columnar members 8a to 9b) of the storage item gripping means 6. As a matter of course, as the support member 14, the storage item C itself can be used instead. Also, depending on the case, as indicated by imaginary lines in FIG. 5B, the distance measuring means 12 can be attachably/detachably attached to an arbitrary one of the four gripping columnar members 8a to 9b so as to face downward. As the distance measuring means 12, various types of conventionally known ones can be utilized such as a distance sensor utilizing laser light or ultrasonic waves or a mechanical distance measuring device. As the mechanical distance measuring device, for example, a mechanical distance measuring device can be utilized that is formed with a main body which is attached to an arbitrary one of the support members 13 and 14 or of the four gripping columnar members 8a to 9b, a measuring rod-shaped member which is supported on the main body so as to be freely and vertically raised and lowered, and a detector which is attached to the main body so as to detect the distance of the lowering of the measuring rod-shaped member until the lower end of the measuring rod-shaped member makes contact with the storage item placement plane 1.

Figure 6:
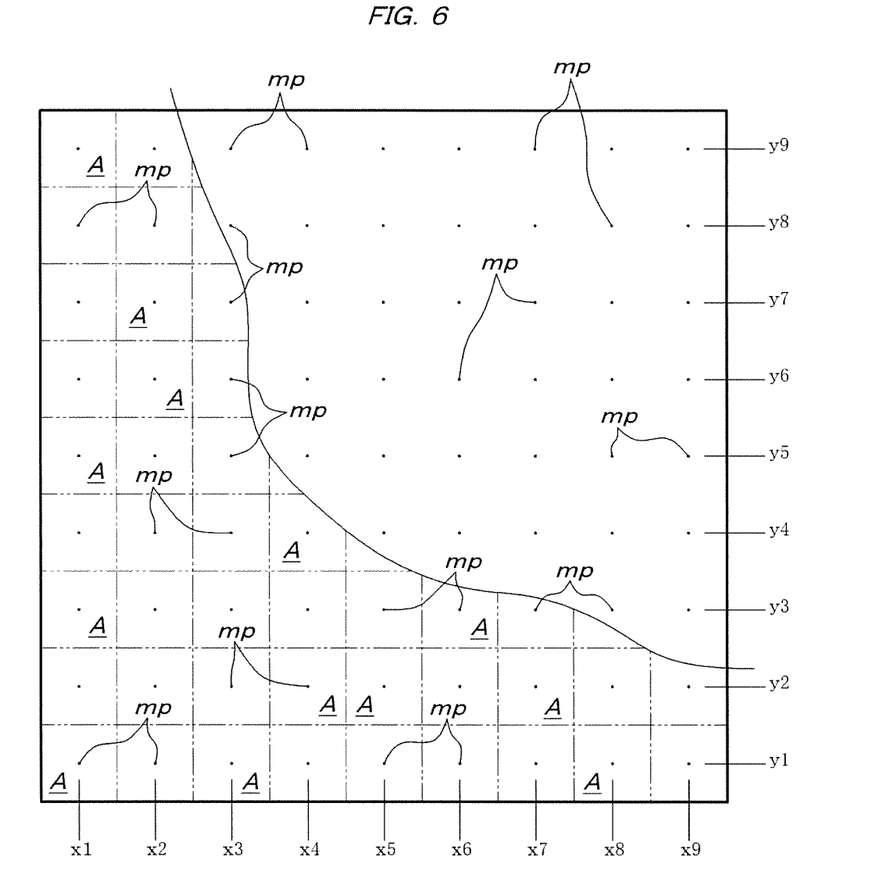
FIG. 6 is a plan view illustrating vertical distance measurement points on the storage item placement plane.

On the other hand, in order to perform the measurement/setting operation, as shown in FIG. 6, unit sections A which are aligned in a grid pattern in the X direction and the Y direction and which are, for example, 1 m square and measurement points mp each of which is located in the center of each unit sections A are imaginarily set on the storage item placement plane 1. In the example of the figure, x1 to x9 for the X direction and y1 to y9 for the Y direction are set as addresses, and X-Y coordinate values which are formed with combinations of X-direction addresses and Y-direction addresses are set as absolute addresses for the respective unit sections A.

After the installation of the flat storage facility, the distance measuring means 12 is used to perform the measurement/setting operation. That is, as shown in FIGS. 3 and 4, the distance measuring means 12 which is moved together with the carriage 5 is located directly above the measurement point mp in the center of one unit section A by the Y-direction lateral movement of the Y-direction laterally moving member 3 and the X-direction movement of the carriage 5 on the Y-direction laterally moving member 3. In such a state, the vertical distance up to the measurement point mp on the storage item placement plane 1 is measured with the distance measuring means 12, and the measured vertical distance value is recorded so as to correspond to the absolute address (X-Y coordinate value) of the unit section A. When the vertical distance values for all the unit sections A on the storage item placement plane 1 are recorded in this way, then the maximum vertical distance value among the recorded vertical distances, in other words, the vertical distance value of the unit section A whose surface height is the lowest among all the unit sections A on the storage item placement plane 1 is set to a reference plane value, for all other unit sections A, differences between the measured vertical distance values and the reference plane value are calculated, for example, in units of mm and they are recorded as differences in height with respect to the reference plane so as to correspond to the absolute addresses (X-Y coordinate values) for all the unit sections A.

Figure 7:
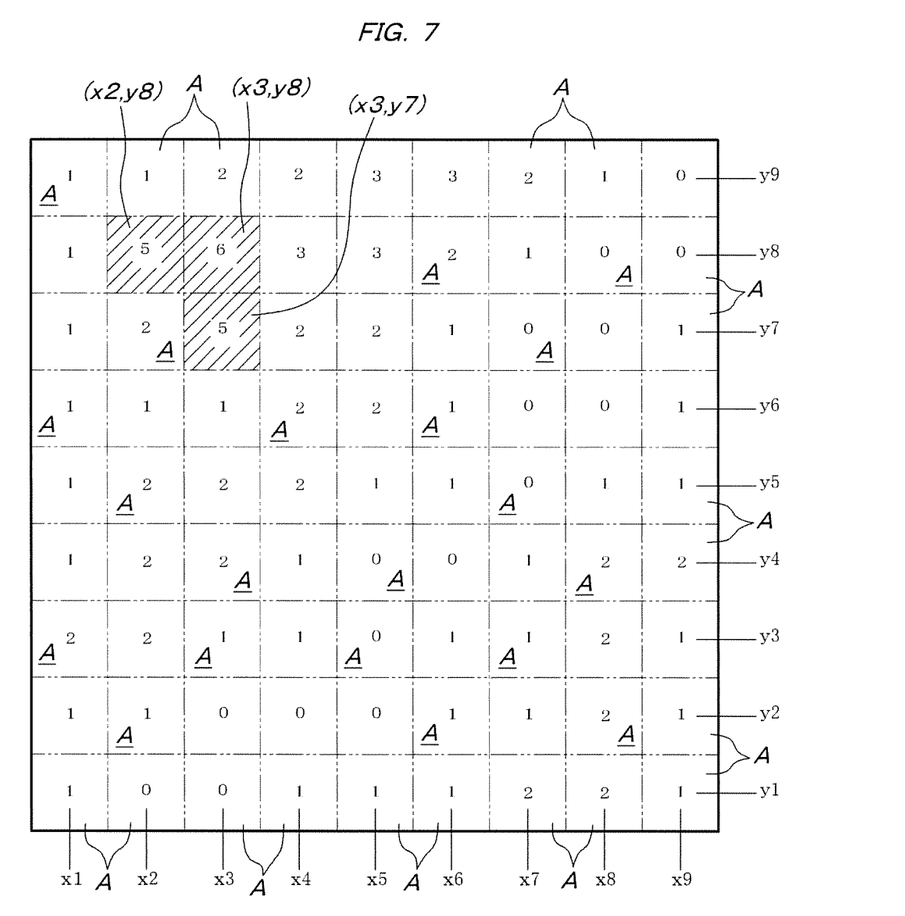
FIG. 7 is a plan view illustrating the results of measurements.

In FIG. 7, values of 0 to 6 shown within the individual unit sections A indicate differences in height of the individual unit sections A with respect to the reference plane in units of 5 mm, and it is found that although in most of the unit sections A, differences in height are about 0 to +3 mm, differences in height of specific unit sections A of three places whose absolute addresses are (x2, y8), (x3, y7), and (x3, y8) are +5 to +6 mm exceed a set value of, for example, 3 mm as compared with differences in height of the unit sections A therearound. However, the mutual differences in height of the specific unit sections A of the three places do not indicate that entire surfaces within the unit sections A are flat surfaces 5 to 6 mm higher but indicate that the measurement points mp in the center positions within the unit sections A are increased in height by such values. On the other hand, in this embodiment, since the size of the unit section A is significantly increased as compared with the planar size of the storage item C to be handled (such as a portable plastic box-shaped container) so as to be 1 m square such that the number of times of measurements is reduced, when as described later, in a case where storage item placement points which are set on the storage item placement plane 1 regardless of the unit sections A are set away from the respective center positions within the specific unit sections A (x2, y8), (x3, y7), and (x3, y8) of the three places, the actual differences in height of the storage item placement points are not always the results of the measurements and computations described above, which are +5 to +6 mm.

Figure 8:
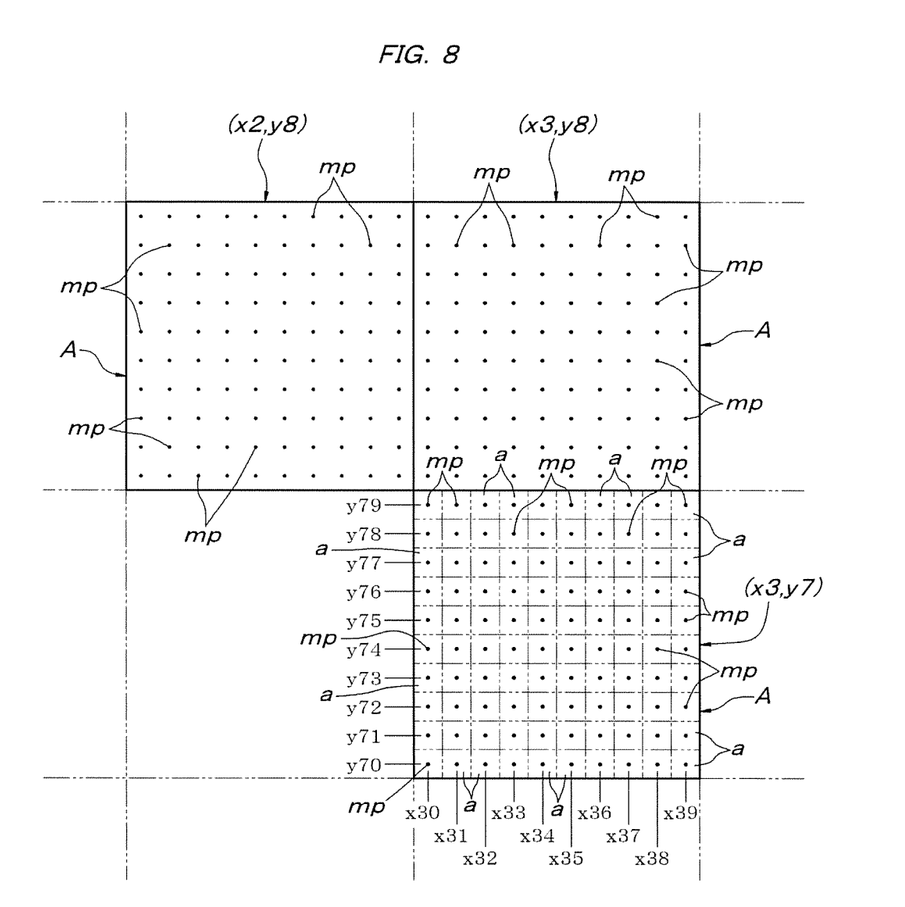
FIG. 8 is an enlarged plan view of a main portion illustrating the presence of specific unit sections on the storage item placement plane.
Figure 9:
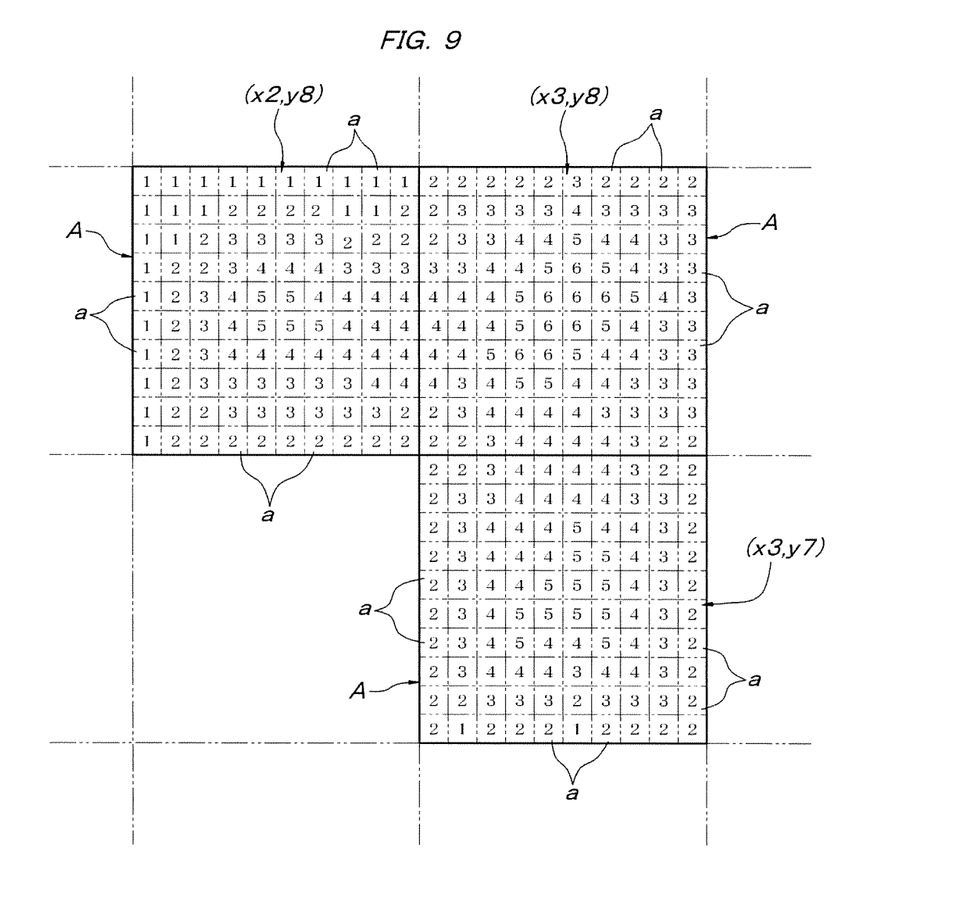
FIG. 9 is a plan view illustrating the results of measurements for the specific unit sections of FIG. 8.

In the case of such situations, the measurement/setting operation is performed again as described below for the specific unit sections A (x2, y8), (x3, y7), and (x3, y8) of the three places having the abnormal differences in height. That is, as shown in FIG. 8, small sections a which are aligned in a grid pattern in the X direction and the Y direction within the respective specific unit sections A (x2, y8), (x3, y7), and (x3, y8) and which are, for example, 10 cm square and measurement points mp each of which is located in the center of each small sections a are imaginarily set. Then, on the measurement points mp of all the small sections a within the specific unit sections A (x2, y8), (x3, y7), and (x3, y8) of the three places, the same measurement/setting operation as that performed on the unit sections A is performed such that on all the small sections a within the specific unit sections A (x2, y8), (x3, y7), and (x3, y8) of the three places, differences in height with respect to the reference plane are computed and set. In FIG. 9, values shown within the individual small sections a indicate differences in height of the individual small sections a with respect to the reference plane in units of mm.

It is noted that, in a case where a specific region in which the storage item placement plane 1 is remarkably elevated or recessed is recognized by the visual observation of the entire storage item placement plane 1, it is also possible to set the above-described small sections a for the specific region from the beginning so as to omit the re-measurement/setting operation. As a matter of course, the small sections a may be set on the entire storage item placement plane 1 from the beginning, and the measurement/setting operation may be performed.

Figure 10:
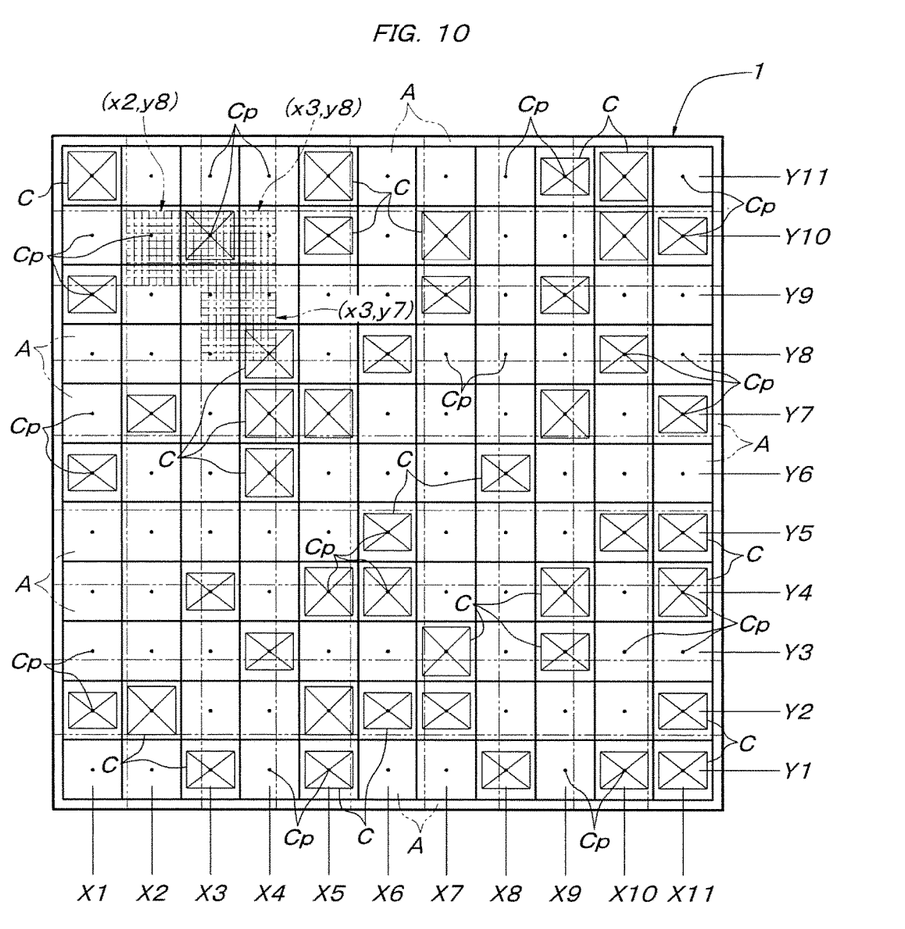
FIG. 10 is a plan view illustrating storage item placement points on the storage item placement plane.

When the measurement/setting operation described above is completed, as shown in FIG. 10, storage item placement points Cp are set on the entire storage item placement plane 1. The setting of the storage item placement points Cp is performed completely regardless of the unit sections A and the small sections a which are imaginarily set for the measurement/setting operation and which are indicated by imaginary lines in FIG. 10, and the storage item placement point Cp is set in the center of each storage item placement section in the shape of a quadrangle in plan view aligned in a grid pattern in the X direction and the Y direction. The respective storage item placement points Cp are positions in which the storage items C are supported in a state where the storage item placement points Cp match the center points of the storage items C in plan view, and in the example shown in FIG. 10, X-Y coordinate values which are obtained by combinations of the X-direction coordinate values of X1 to X11 and the Y-direction coordinate values of Y1 to Y11 and which identify the positions on the storage item placement plane 1 are assigned to all the storage item placement points Cp.

For all the storage item placement points Cp set as described above, the lowering distance adjustment values of the storage item gripping means 6 when a storage/retrieval operation using the storage item gripping means 6 is performed on the storage items C are set. That is, since all the storage item placement points Cp belong to one of the unit sections A shown in FIG. 7 or one of the small sections a within the specific unit sections A (x2, y8), (x3, y7), and (x3, y8) shown in FIG. 9, for each of the storage item placement points Cp, the lowering distance adjustment value is set that is equal to a difference in height (a value shown in each of the unit sections A in FIG. 7 or a value shown in each of the small sections a in FIG. 9) with respect to the reference plane set for the unit section A or the small section a to which the storage item placement point Cp belongs. In this embodiment, as described previously, since a difference in height of +value with respect to the lowest reference plane is set, the lowering distance adjustment value of each of the storage item placement points Cp is a value which is obtained by reducing the lowering distance of the storage item gripping means 6 by the difference in height (+value) set for the storage item placement point Cp. A specific example will be described with reference to FIG. 11. Storage item placement sections having the storage item placement points Cp within the specific unit sections A (x2, y8), (x3, y7), and (x3, y8) of FIG. 9 are (X2, Y10), (X3, Y8), (X3, Y9), (X3, Y10), (X4, Y8), (X4, Y9), and (X4, Y10), and the lowering distance adjustment values set for the storage item placement points Cp in these storage item placement sections are, with reference to FIG. 9:

the lowering distance adjustment value for the storage item placement point Cp in the storage item placement section (X2, Y10)
=−3 mm for cancelling out a difference in height of +3 mm in a small section (x24, y87) within the specific unit section (x2, y8), the lowering distance adjustment value for the storage item placement point Cp in the storage item placement section (X3, Y8)
=−1 mm for cancelling out a difference in height of +1 mm in a small section (x31, y70) within the specific unit section (x3, y7), the lowering distance adjustment value for the storage item placement point Cp in the storage item placement section (X3, Y9)
=−3 mm for cancelling out a difference in height of +3 mm in a small section (x31, y78) within the specific unit section (x3, y7), the lowering distance adjustment value for the storage item placement point Cp in the storage item placement section (X3, Y10)

=−3 mm for cancelling out a difference in height of +3 mm in a small section (x31, y87) within the specific unit section (x3, y8), the lowering distance adjustment value for the storage item placement point Cp in the storage item placement section (X4, Y8)

=−2 mm for cancelling out a difference in height of +2 mm in a small section (x39, y70) within the specific unit section (x3, y7), the lowering distance adjustment value for the storage item placement point Cp in the storage item placement section (X4, Y9)

=−2 mm for cancelling out a difference in height of +2 mm in a small section (x39, y78) within the specific unit section (x3, y7), the lowering distance adjustment value for the storage item placement point Cp in the storage item placement section (X4, Y10)

Figure 11:
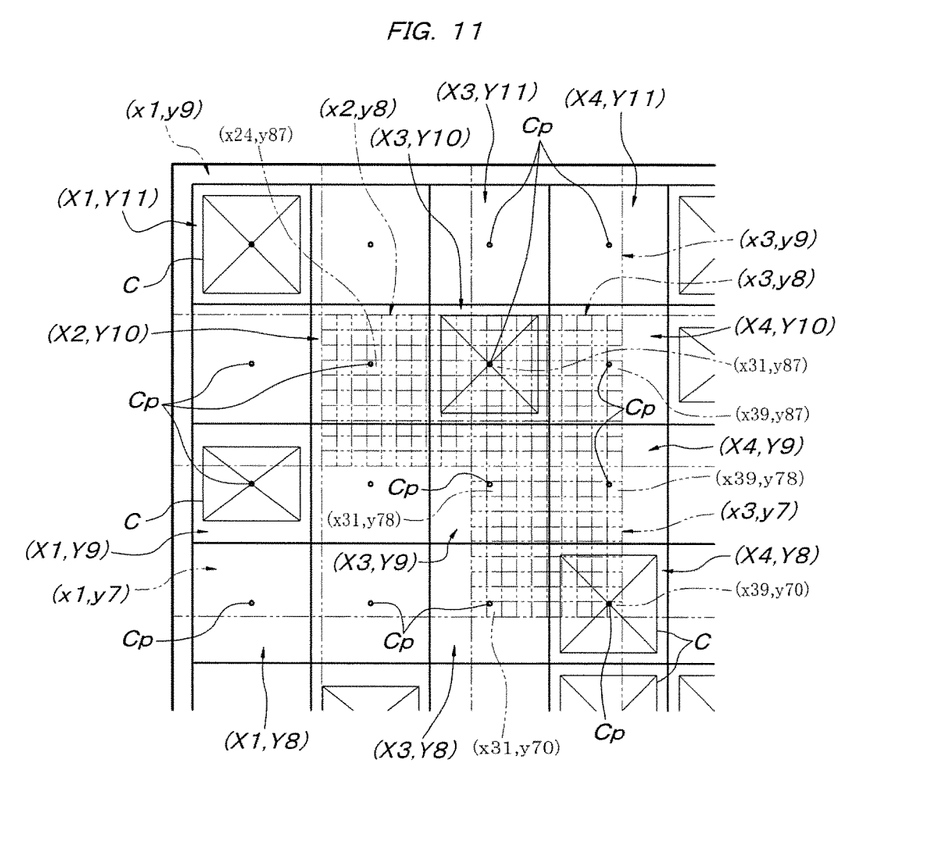
FIG. 11 is a partially enlarged view of FIG. 10.

=−3 mm for cancelling out a difference in height of +3 mm in a small section (x39, y87) within the specific unit section (x3, y8). With respect to storage item placement sections having the storage item placement points Cp within the unit sections A other than the specific unit sections A (x2, y8), (x3, y7), and (x3, y8) of FIG. 9, —value for cancelling out a difference in height (a value shown in each of the unit sections A in FIG. 7) set for the unit section A to which the storage item placement point Cp belongs is the lowering distance adjustment value. Some specific examples will be given below with reference to FIG. 11, for example:

the lowering distance adjustment value for the storage item placement point Cp in the storage item placement sections (X1 , Y8) and (X1 , Y9)

=−1 mm for cancelling out a difference in height of +1 mm set for a unit section (x1, y7), the lowering distance adjustment value for the storage item placement point Cp in the storage item placement section (X1 , Y11)

=−1 mm for cancelling out a difference in height of +1 mm set for a unit section (x1, y9), the lowering distance adjustment value for the storage item placement point Cp in the storage item placement sections (X3, Y11) and (X4, Y11)

=−2 mm for cancelling out a difference in height of +2 mm set for a unit section (x3, y9).

Since the lowering distance adjustment values are individually set for the storage item placement points Cp in all the storage item placement sections set on the storage item placement plane 1 as described above, when the storage/retrieval operation is actually performed, the lowering driving of the storage item gripping means 6 is controlled such that the lowering distance of the storage item gripping means 6 is reduced by the lowering distance adjustment value set for the storage item placement point Cp of a storage/retrieval target. That is, when the storage/retrieval operation is performed on the storage item placement point Cp in which the lowering distance adjustment value is set to 0 mm, the lowering distance of the storage item gripping means 6 is a reference value by which the storage item gripping means 6 can be lowered to a position at a certain height from the top of the reference plane having a difference in height of 0, that is, a position where the gripping release or the gripping action can be properly performed on the storage item, and, when the storage/retrieval operation is performed on the storage item placement point Cp in which the lowering distance adjustment value is set to −1 mm, the lowering distance of the storage item gripping means 6 is the reference value of −1 mm whereas when the storage/retrieval operation is performed on the storage item placement point Cp in which the lowering distance adjustment value is set to −2 mm, the lowering distance of the storage item gripping means 6 is the reference value of −2 mm. By applying the lowering distance adjustment values, the storage item gripping means 6 can be constantly lowered to the position at a certain height from the top of the storage item placement plane 1 where the storage item placement point Cp of the storage/retrieval target is present, with the result that the gripping release or the gripping action for a storage item can be constantly and properly performed on the storage item regardless of the unevenness of the storage item placement plane 1.

A method for controlling a storage/retrieval device in a flat storage facility according to the present invention is a method for controlling a flat storage facility in which a ceiling traveling crane-type storage/retrieval device is used to perform a storage/retrieval operation for a storage item with regard to a storage item placement plane, and can be utilized as a controlling method when as the storage item placement plane, in particular a large floor surface within a building or the like is utilized as is.

The invention claimed is:

1. A method for controlling a storage/retrieval device in a flat storage facility which includes a storage item placement plane and a storage/retrieval device, in which the storage/retrieval device includes: a Y-direction laterally moving member that is freely moved laterally in a horizontal Y direction at a certain height above the storage item placement plane; a carriage that is freely moved horizontally in an X direction perpendicularly intersecting the Y direction on the Y-direction laterally moving member; and a storage item gripping means that is provided in the carriage so as to be freely raised and lowered, and in which the storage/retrieval device performs a storage/retrieval operation on a storage item between the storage/retrieval device and respective storage item placement points set on the storage item placement plane, the method comprising:

dividing the storage item placement plane being into a plurality of equally-sized unit sections;

measuring, for each of the unit sections, a difference in height with respect to a reference plane of the storage item placement plane;

recording the measured difference in height for each of the unit sections with respect to the reference plane of the storage item placement plane;

decreasing the size of a first unit section set for a region where a degree of unevenness is at or above a predetermined value within the storage item placement plane;

increasing the size of a second unit section set for a region where a degree of unevenness is below the predetermined value within the storage item placement plane; and adjusting, when the storage/retrieval operation is performed with the storage/retrieval device, a lowering distance of the storage item gripping means with respect to the carriage by the difference in height of the unit section to which the storage item placement point of a storage/retrieval target belongs.

2. The method for controlling a storage/retrieval device in a flat storage facility according to claim 1, further comprising the steps of:

providing a distance measuring means which is moved in the X direction together with the carriage of the storage/retrieval device;

measuring with the distance measuring means, for each of the unit sections dividing the storage item placement plane, a vertical distance up to the storage item placement plane;

computing a difference in height with respect to the reference plane from the measured value; and recording the computed difference in height with respect to the reference plane from the measured value.

3. The method for controlling a storage/retrieval device in a flat storage facility according to claim 2, wherein:

the distance measuring means is attached to the carriage of the storage/retrieval device.

4. The method for controlling a storage/retrieval device in a flat storage facility according to claim 2, wherein:

the distance measuring means is attached to a lower end portion of the storage item gripping means of the storage/retrieval device.

5. The method for controlling a storage/retrieval device in a flat storage facility according to claim 4, wherein:

the distance measuring means is attached to a support member gripped by the storage item gripping means.

6. A method for controlling a storage/retrieval device in a flat storage facility which includes a storage item placement plane and a storage/retrieval device, in which the storage/retrieval device includes: a Y-direction laterally moving member that is freely moved laterally in a horizontal Y direction at a certain height above the storage item placement plane; a carriage that is freely moved horizontally in an X direction perpendicularly intersecting the Y direction on the Y-direction laterally moving member; and a storage item gripping means that is provided in the carriage so as to be freely raised and lowered, and in which the storage/retrieval device performs a storage/retrieval operation on a storage item between the storage/retrieval device and respective storage item placement points set on the storage item placement plane, the method comprising:

dividing the storage item placement plane being into a plurality of equally-sized unit sections, measuring, for each of the unit sections, a difference in height with respect to a reference plane of the storage item placement plane;

recording the measured difference in height for each of the unit sections with respect to the reference plane of the storage item placement plane;

adjusting, when the storage/retrieval operation is performed with the storage/retrieval device, a lowering distance of the storage item gripping means with respect to the carriage by the difference in height of the unit section to which the storage item placement point of a storage/retrieval target belongs;

sub-dividing a first unit section into a plurality of sub-sections when the difference in height of the first unit section is equal to or more than a predetermined value;

measuring the difference in height for each of the sub-sections;

adjusting, when the storage/retrieval is performed on the storage item placement point belonging to the first unit section, the lowering distance of the storage item gripping means with respect to the carriage by the difference in height of the sub-section to which the storage item placement point of the storage/retrieval target belongs.

7. The method for controlling a storage/retrieval device in a flat storage facility according to claim 6, further comprising the steps of:

providing a distance measuring means which is moved in the X direction together with the carriage of the storage/retrieval device;

measuring with the distance measuring means, for each of the unit sections dividing the storage item placement plane, a vertical distance up to the storage item placement plane;

computing a difference in height with respect to the reference plane from the measured value; and recording the computed difference in height with respect to the reference plane from the measured value.

8. The method for controlling a storage/retrieval device in a flat storage facility according to claim 7, wherein:

the distance measuring means is attached to the carriage of the storage/retrieval device.

9. The method for controlling a storage/retrieval device in a flat storage facility according to claim 7, wherein:

the distance measuring means is attached to a lower end portion of the storage item gripping means of the storage/retrieval device.

10. The method for controlling a storage/retrieval device in a flat storage facility according to claim 9, wherein:

the distance measuring means is attached to a support member gripped by the storage item gripping means.

* * * * *